Jan. 31, 1939.  G. SAKIER  2,145,838
ATTACHING DEVICE FOR MEAT GRINDERS, ETC
Filed Jan. 13, 1937
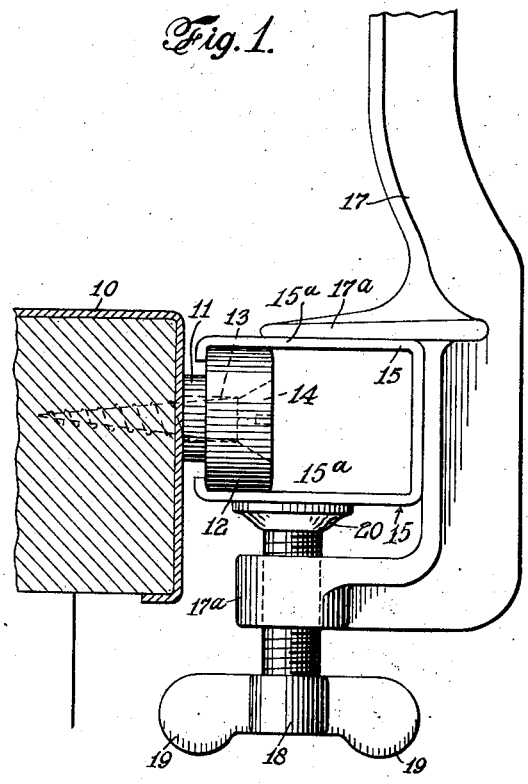
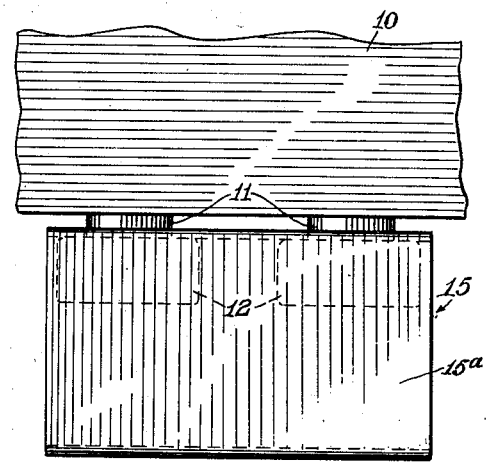
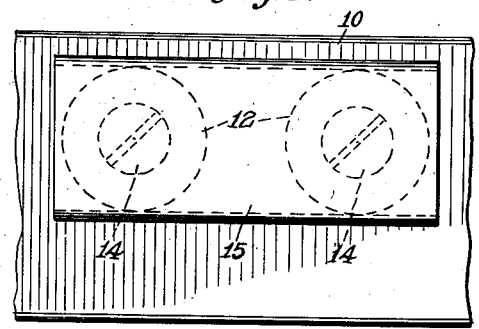
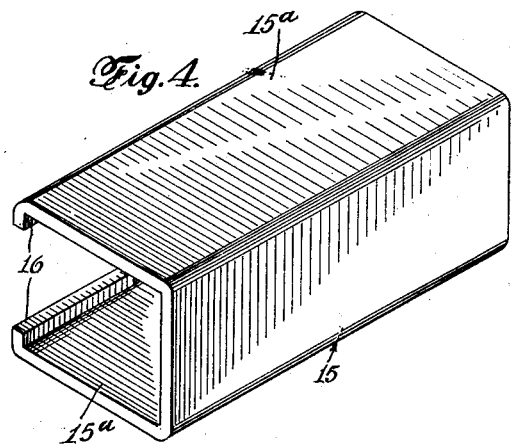
INVENTOR.
GEORGE SAKIER
BY Conrad A. Dittrich
HIS ATTORNEY.

Patented Jan. 31, 1939

2,145,838

UNITED STATES PATENT OFFICE 2,145,838

ATTACHING DEVICE FOR MEAT GRINDERS, ETC.

George Sakier, New York, N. Y., assignor to The Accessories Company, Inc., New York, N. Y., a corporation of Delaware Application January 13, 1937, Serial No. 120,344

4 Claims. (Cl. 248—205)

My invention relates to means for supporting meat grinders, coffee mills, and analogous or other kitchen utensils, and the same has for its object to provide a simple, efficient and inexpensive device whereby such utensils may be readily attached to a table, shelf or other support.

Further, said invention has for its object to provide means which will permit of the supporting of meat grinders, coffee mills and other utensils upon enameled tables, cabinets, or other coated surfaces in such manner as will not damage or mar the enameled or coated surface.

Further, said invention has for its object to provide means consisting, in part, of a fixed member, and, in part, of a removable member which are adapted to receive or be engaged by the clamping device of a utensil whereby to rigidly secure said utensil to a table, cabinet, shelf or other support.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawing—

Figure 1 is an end view showing one form of attaching device constructed according to, and embodying my said invention; the same also showing a portion of a bracket arm and clamping device of a meat grinder or analogous utensil;

Fig. 2 is a top view thereof;

Fig. 3 is a front view of the device partly broken away, and in section, and

Fig. 4 is a detail perspective view of the channel bar adapted to receive or be engaged by the clamping device of the utensil to be supported.

In said drawing 10 designates a part of an enamel table or cabinet top or similar support to the vertical edge of which are secured engageable supporting devices in the form of short cylindrical posts or body portions 11 having heads 12 of greater diameter or outline than said posts or body portions in order to form a recess between the rear side of said heads 12 and the front edge of the table or cabinet top 10.

The said engageable devices 11 are each provided with a central opening 13 extending therethrough to receive the screw 14 whereby said devices 11 are rigidly secured to the table or cabinet top 10.

15 denotes a U-shape channel member, preferably made of sheet metal and having the free ends of its side walls 15ª bent inwardly towards each other at 16. The interior height of the channel member is substantially equal to that of the diameter of the head 12 of the post 11 of the engageable device and fits snugly over the same with the inturned ends 16 thereof extending between the rear sides of the heads 12 and the outer vertical side of the table top 10.

17 denotes the bracket arm or standard of a meat chopper or other utensil, having its lower end terminating in two spaced horizontally-extending members 17ª, of which the lower one is provided with a clamping screw 18 having finger portions or wings 19 at its lower end, and having a washer 20 at its upper end. The upper horizontal member 17ª is adapted to rest upon the upper wall portion 15ª of the channel member 15, and the washer 20 of the clamping screw 18 is adapted to be forced into engagement with the underside of the lower wall portion 15ª of the channel member 15 in order to hold the channel member firmly in engagement with the heads 12 of the engageable devices, and to maintain the bracket arm 17 firmly secured in position upon said channel member 15.

The operation of the device will be largely obvious from the foregoing description. It is to be observed, however, that the channel member 15 being made of relatively thin sheet metal, the parallel wall portions thereof will be more or less resilient or yielding, and thus facilitate the applying of said channel member to the heads 12 of the engageable devices, and permit of said walls being forced into intimate and firm engagement with the heads 12 of said engageable devices by the action of the clamping screw 18 of the utensil to be supported.

Further, it is to be noted that the invention is not limited in its use to supporting meat grinders, coffee mills or the like, and that the claims, while specifying such structures, are not intended to apply solely to such structures, but are intended to include generally any utensil or device capable of being attached to the supporting device.

Having thus described my said invention what I claim and desire to secure by Letters Patent is:

1. A device for supporting a meat grinder or analogous utensil comprising a support, recessed engageable means on said support, and a U-shape member having the ends of its side wall portions extending towards each other and embracing said engageable means and its said side walls adapted to be forced into engagement with said engageable means by pressure exerted by the securing means of said meat grinder or analogous utensil.

2. A device for supporting a meat grinder or analogous utensil comprising a support, a plurality of engageable members secured to said support; said engageable members having enlarged ends, and a longitudinal U-shape member having the free ends of its side wall portions bent inwardly and engaging over the enlarged ends of said engageable members, and the side walls of said U-shape member adapted to be forced into engagement with said engageable members by pressure exerted by the securing means of said meat grinder or analogous utensil.

3. A device for supporting a meat grinder or analogous utensil comprising a support, a plurality of engageable members secured to said support; said engageable members each including a body portion having a head of greater outline than said body portion, and a longitudinal U-shape member having the free ends of its side wall portions bent inwardly and engaging over the heads of said engageable members, and the side walls of said U-shape member adapted to be forced into engagement with said engageable members by pressure exerted by the securing means of said meat grinder or analogous utensil.

4. A device for supporting a meat grinder or the like having clamping jaws, comprising an engageable member adapted to be permanently secured to the edge of a table-like support and to project horizontally therefrom for a distance substantially less than the depth of the clamping jaws of the grinder, a U-shaped metal clip adapted to fit between said jaws for substantially their full depth and to have the free ends of its side wall portions removably engaged over said member, and adapted to be clamped thereon by said jaws, said member and clip having inter-engaging portions preventing movement of the clip away from the edge of said support.

GEORGE SAKIER.